(12) United States Patent
Baumgartner et al.

(10) Patent No.: US 7,859,389 B2
(45) Date of Patent: *Dec. 28, 2010

(54) TRANSMITTER MODULATION SWITCHING

(75) Inventors: Josef Baumgartner, Voels (AT); Gerald Ostrander, Davison, MI (US); Patricia Kachouh, Sterling Heights, MI (US)

(73) Assignee: Continental Automotive Corporation, Auburn Hills, MI (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/030,363

(22) Filed: Feb. 13, 2008

(65) Prior Publication Data

US 2008/0136590 A1 Jun. 12, 2008

Related U.S. Application Data

(63) Continuation of application No. 11/364,475, filed on Feb. 28, 2006, now Pat. No. 7,369,040.

(60) Provisional application No. 60/686,068, filed on May 27, 2005.

(51) Int. Cl.
*B60R 25/10* (2006.01)

(52) U.S. Cl. ............... 340/426.36; 340/5.61; 340/5.72; 340/10.2; 307/10.2

(58) Field of Classification Search ............ 340/426.36, 340/5.61, 426.13, 5.72, 426.16, 825.72, 447, 340/430, 425.5, 445, 539.1, 10.1, 10.2, 10.3; 307/10.2, 322, 316; 455/125; 333/124, 170
See application file for complete search history.

(56) References Cited

U.S. PATENT DOCUMENTS

| 6,420,967 | B1 | 7/2002 | Ghabra et al. |
| 7,102,498 | B2 * | 9/2006 | Desai et al. ................. 340/447 |
| 7,369,040 | B2 * | 5/2008 | Baumgartner et al. .. 340/426.36 |
| 2005/0003781 | A1 | 1/2005 | Kunz et al. |
| 2005/0190859 | A1 | 9/2005 | Brandwein, Jr. |
| 2005/0232376 | A1 | 10/2005 | Liem et al. |

* cited by examiner

*Primary Examiner*—Anh V La

(57) ABSTRACT

An example receiver/transmitter for a passive start and entry system switches between amplitude shift keyed modulation and frequency shift keyed modulation to maintain clear uninterrupted and dependable communication with a remote transmitter in the presence of interfering signals. The receiver/transmitter is switched to receive incoming FSK signals in response to the RSSI becoming saturated by undesired signals. The switch to FSK signal modulation occurs by signaling the remote transmitter to change over and begin sending FSK modulated signals. The FSK modulated signals are then received without significant interference.

12 Claims, 1 Drawing Sheet

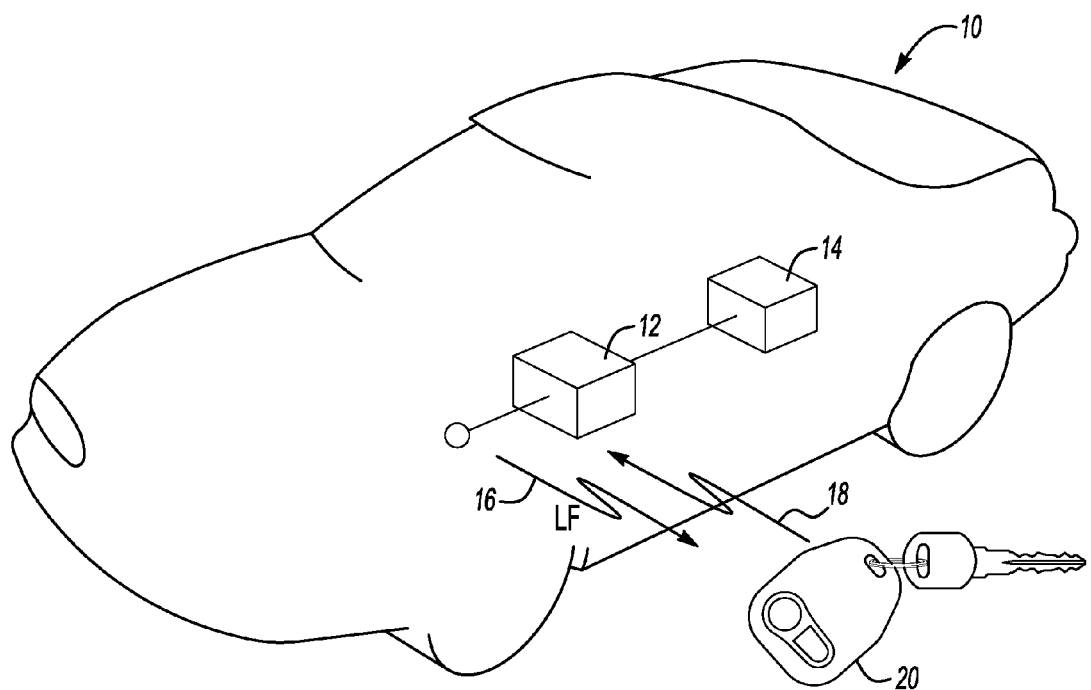
*Fig-1*
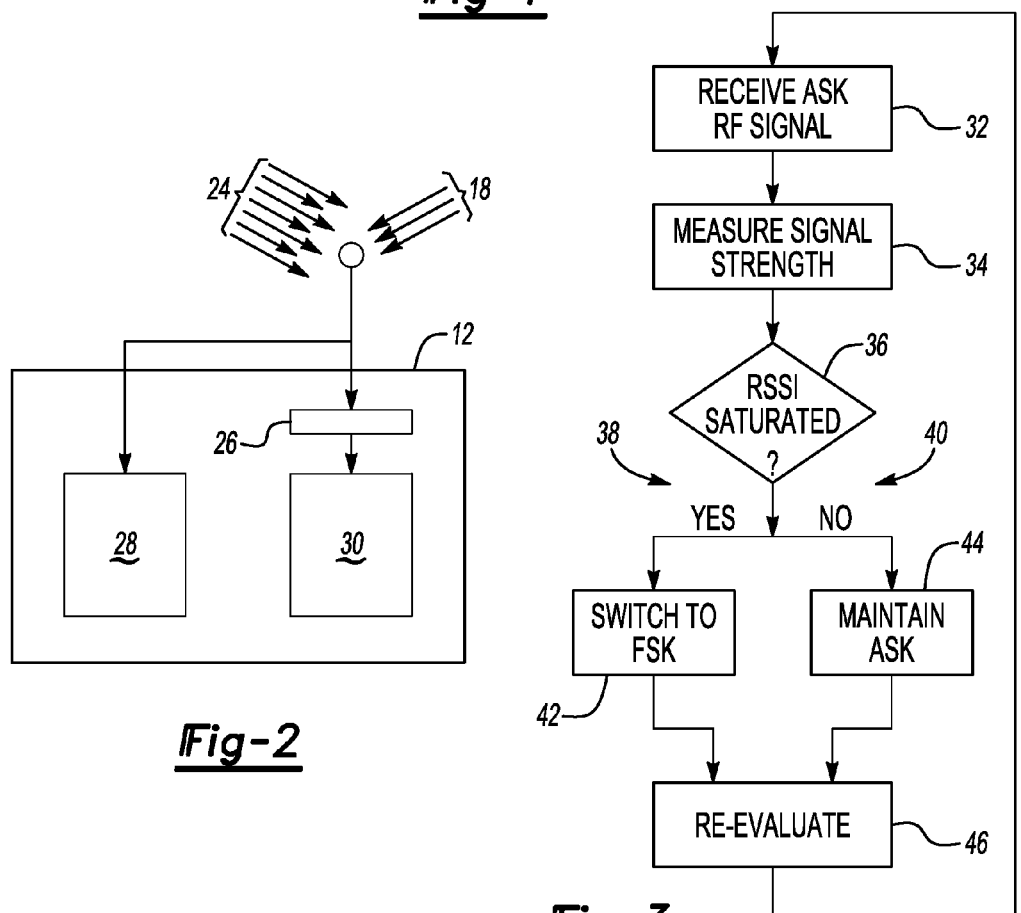
*Fig-2*
*Fig-3*

TRANSMITTER MODULATION SWITCHING

CROSS REFERENCE TO RELATED APPLICATION

This application is a continuation of U.S. application Ser. No. 11/364,475 filed Feb. 28, 2006, now U.S. Pat. No. 7,369,040, which claims priority to U.S. Provisional Application No. 60/686,068 which was filed on May 27, 2005.

BACKGROUND OF THE INVENTION

This invention generally relates to a method of operating a receiver/transmitter that sends and receives signals to a remote transmitter.

A remote keyless entry system includes a receiver/transmitter disposed within a vehicle that communicates with a remote transmitter such as for example a key fob or other remote signaling device. The receiver sends out a Low Frequency (LF) signal to the remote actuation device, and the remote transmitter answers the receiver/transmitter by transmitting a radio frequency (RF) signal in recognition of the LF signal sent by the receiver/transmitter. Typically, the remote transmitter utilizes an Amplitude Shift Keyed (ASK) modulated RF signal for transmitting information to the receiver. The signal includes information utilized by the receiver/transmitter and system controller to initiate actuation of door locks, or other remotely controlled devices such as a remotely operated trunk, hatch or sliding door. A received signal strength indicator (RSSI) measures and decodes the incoming ASK modulated signal.

Disadvantageously, interference from surrounding RF signals such as for example garage door openers can overload the RSSI and prevent the desired ASK signal from being cleanly received resulting in difficulties remotely operating functions of the vehicle.

Accordingly, there is a need to develop a method of preventing unwanted signals from disrupting and preventing accurate and reliable communication between a receiver/transmitter and a remote actuation device.

SUMMARY OF THE INVENTION

An example receiver/transmitter for a passive start and entry system switches between amplitude shift keyed (ASK) modulation and frequency shift keyed (FSK) modulation to maintain clear uninterrupted and dependable communication with a remote transmitter in the presence of interfering signals.

A passive start and entry system (PASE) utilizes a receiver/transmitter to communicate with a remote actuation device such as a key fob. The remote transmitter communicates with the receiver/transmitter through ASK modulated radio frequency signals. The remote transmitter receives a desired signal from the receiver/transceiver that is demodulated and decoded to assure proper operation.

The ASK modulated signal sent by the remote transmitter is received by a received signal strength indicator (RSSI) that measures and decodes the incoming signal. In the presence of external undesired signals, the RSSI can become saturated such that no desired signals can be received. The receiver/transmitter also includes an FSK portion for receiving FSK modulated signals. The FSK portion does not require the RSSI for measuring and decoding incoming signals and therefore is not affected by extraneous and unwanted signals. The receiver/transmitter is switched to receive incoming FSK signals in response to the RSSI becoming saturated by undesired signals. The switch to FSK signal modulation occurs by signaling the remote actuation device to begin sending FSK modulated signals. The FSK modulated signals are then received without interference generated in the RSSI.

Accordingly, the system and method according to this invention provides for the uninterrupted, clear and dependable communication between a remote transmitter and a receiver/transmitter regardless of the presence of interfering signals.

These and other features of the present invention can be best understood from the following specification and drawings, the following of which is a brief description.

BRIEF DESCRIPTION OF THE DRAWINGS

FIG. 1 is schematic view of a vehicle including an example system according to this invention.

FIG. 2 is a schematic view of an example receiver/transmitter according to this invention.

FIG. 3 is a block diagram illustrating example method steps according to this invention.

DETAILED DESCRIPTION OF THE PREFERRED EMBODIMENT

Referring to FIG. 1, a vehicle 10 includes a passive start and entry system (PASE) schematically indicated at 14 that utilizes a receiver/transmitter 12 to communicate with a remote transmitter such as a key fob 20. The key fob 20 communicates with the receiver/transmitter 12 through Amplitude Shift Keyed (ASK) modulated Radio Frequency (RF) signals and receives desired signals 16 from the receiver/transceiver 14 that are demodulated and decoded to assure proper operation. The receiver/transmitter 12 emits the signal 16 to assure synchronization between the key fob 20 and the various operating system actuated responsive to operation of the key fob 20.

The receiver/transmitter 12 receives ASK modulated signals to keep an FCC averaging factor within desired values. In operation the signals sent out by the receiver/transmitter 12 are answered by an ASK modulated signal 18 from the key fob 20. In the example shown the remote transmitter is a key fob 20. However, other passive and active devices for transmitting information are within the contemplation of this invention.

Referring to FIG. 2, the desired ASK modulated signal 18 is received by the receiver/transmitter 12 and specifically a received signal strength indicator (RSSI) 26 that measures and decodes the incoming signal 18. In the presence of external undesired signals 24, the RSSI 26 can become saturated such that no desired signals 18 can be received. As appreciated, if the remote transmitter is prevented from communicating with the receiver/transmitter 12, the remotely controlled vehicle functions may not operate as desired.

The receiver/transmitter 12 also includes an FSK portion 28 for receiving FSK modulated signals. The FSK portion 28 does not require the RSSI 26 for measuring and decoding incoming signals and therefore is not affected by extraneous and unwanted ASK signals 24. The receiver/transmitter 12 is switched to receive incoming FSK signals in response to the RSSI 26 becoming saturated by undesired signals 24. The receiver/transmitter 12 signals remote transmitter 20 to switch to FSK signal modulation. The remote transmitter 20 then begins sending FSK modulated signals that are received without interference generated in the RSSI 26.

Referring to FIG. 3, the method steps are schematically shown and begin with the remote transmitter 20 sending an ASK modulated signal 18 to the receiver/transmitter 12 responsive to the signal 16 sent by the receiver/transmitter 12 as is indicated at 32. The RSSI 26 measures and decodes the ASK modulated signal 16. In normal operation, the RSSI 26 is not saturated and the ASK modulated signal 18 is utilized to communicate with the remote transmitter 20.

However, in the event that undesirable signals cause a saturation of the RSSI 26 beyond a desired level, the receiver/transmitter 12 signals the remote transmitter 20 to send an FSK modulated signal. The receiver/transmitter 12 determines that the RSSI 26 is saturated, as indicated at 36. If it is determined to be saturated as indicated at 42, the receiver/transmitter 12 and remote transmitter 20 will be switched to FSK modulation. If the RSSI 26 is not saturated, both the receiver/transmitter 12 and the remote transmitter 20 will continue sending and receiving ASK modulated signals.

The receiver/transmitter 12 and the remote transmitter 20 will continue sending and receiving FSK modulated signals responsive to the RSSI 26 being saturated. The receiver/transmitter 12 will continue to check and determine if the RSSI 26 is saturated and determined which modulation to utilize. This revaluation continues with each signal that is sent and received as is indicated at 46. Further, the receiver/transmitter 12 can revaluate which modulation scheme is required at a desired interval or in response to a specific action, such as operation of the vehicle, or some remote transmitter function.

Accordingly, the system and method according to this invention provides for the uninterrupted, clear and dependable communication between a remote transmitter and a receiver/transmitter regardless of the presence of interfering signals.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of receiving a signal with a receiver of a remote keyless entry system comprising the steps of:
    a) determining that a received signal strength indicator (RSSI) is saturated such that undesired radio frequency signals prevent clear reception of a desired Amplitude Shift Keyed signal;
    b) switching the receiver to Frequency Shift Keyed Modulation responsive to determining that the RSSI is saturated; and
    c) sending a prompt signal to a remote transmitter instructing the remote transmitter to send an FSK modulated signal.

2. The method as recited in claim 1, including the step of decoding an incoming ASK signal with the RSSI.

3. The method as recited in claim 1, wherein an incoming FSK signal is not decoded with the RSSI.

4. The method as recited in claim 3, wherein the remote transmitter transmits an ASK signal responsive to a signal from the receiver when the RSSI is saturated.

5. The method as recited in claim 1, including resuming communication between the receiver and the remote transmitter in ASK modulation responsive to the RSSI not being saturated by undesired RF signals.

6. The method as recited in claim 1, wherein the remote transmitter comprises a Key Fob.

7. A remote keyless entry system comprising:
    a receiver/transmitter including a received signal strength indicator (RSSI);
    a remote transmitter communicating with the receiver/transmitter, the remote transmitter capable of sending an Amplitude Shift Keyed (ASK) signal and a Frequency shift keyed (FSK) signal, wherein the receiver/transmitter is switched over to receive FSK signals and the remote transmitter is switched from sending an ASK signal to sending an FSK signal in response to the RSSI becoming saturated such that a desired ASK signal cannot be clearly received.

8. The system as recited in claim 7, wherein the receiver/transmitter is initially set to receive ASK modulated signals and the RSSI is utilized to measure and decode the ASK signals.

9. The system as recited in claim 7, wherein the RSSI is not utilized to measure and decode an incoming FSK modulated signal.

10. The system as recited in claim 7, wherein the remote transmitter comprises a key fob.

11. The system as recited in claim 7, wherein the remote transmitter comprises a passive device.

12. The system as recited in claim 7, wherein the receiver/transmitter is supported within a vehicle and is in communication with at least one vehicle system.

* * * * *